United States Patent [19]
Kopp et al.

[11] Patent Number: 5,767,403
[45] Date of Patent: Jun. 16, 1998

[54] BALANCED DRIVELINE ASSEMBLY AND METHOD

[75] Inventors: Gary Edward Kopp, Shelby Township; Kenneth J. Oswandel, Lilvonia; Larry LaBell, Grosse Ile; Chris Peter Nicholas, Berkley; Gary Keith Parker, Shelby Township, all of Mich.

[73] Assignee: Ford Motor Company, Dearborn, Mich.

[21] Appl. No.: 679,916

[22] Filed: Jul. 15, 1996

[51] Int. Cl.⁶ ............................................. G01M 1/16
[52] U.S. Cl. ........................................ 73/468; 73/470
[58] Field of Search ........................ 73/66, 457, 473, 73/478, 468, 470, 462, 458

[56] References Cited

U.S. PATENT DOCUMENTS 3,712,127  1/1973  Petersen ................................ 73/118
3,848,694  11/1974 Matsui et al. ........................... 180/70
3,887,024  6/1975  Takahashi et al. ...................... 180/70
4,170,896  10/1979 Korkosz ................................ 73/462
4,236,407  12/1980 Alpini et al. ........................... 73/118
4,653,324  3/1987  Nugier ................................... 73/460
4,898,026  2/1990  Damitz ................................ 73/118.1
4,939,985  7/1990  Von Thun ........................... 73/118.1
5,419,192  5/1995  Maxwell et al. ....................... 73/462
5,431,049  7/1995  Kopp .................................... 73/457

*Primary Examiner*—Christine K. Oda
*Attorney, Agent, or Firm*—James J. Dottavio

[57] ABSTRACT

A driveline assembly and method for balancing the driveline. The driveline includes a drive shaft assembled to a rear axle having a flange therebetween. The driveline is measured to determine an imbalance and a weight is added to the flange to balance the driveline.

20 Claims, 5 Drawing Sheets

BALANCED DRIVELINE ASSEMBLY AND METHOD

BACKGROUND OF THE INVENTION

1. Field of the Invention

The present invention relates generally to a balanced automotive driveline assembly and a method for balancing a driveline assembly.

2. Description of the Prior Art

Rear wheel drive vehicles include an engine connected to a power transmission and a drive shaft rotatably connected to the transmission. The drive shaft transmits torque to a rear drive axle. The rear drive axle includes a differential which is coupled to the drive shaft to transmit the torque to the driven wheels.

The drive shaft typically includes one or more elongate tubular members coupled to the transmission and axle through a pair of flexible couplings and/or universal joints or other similar coupling devices disposed on either end of the drive shaft. If the drive shaft includes two or more elongate tubular members, the members are connected by a universal joint.

The rear flexible coupling comprises an annular elastomeric member having a six circumferentially spaced through holes in the member. The elastomeric member is secured to the drive shaft using a flange provided on the drive shaft having three holes in registration with every other hole on the elastomeric member. The elastomeric member is secured to a second flange provided on the rear axle having three holes in registration with the alternate holes on the elastomeric member not secured to the drive shaft flange. Bolts and nuts secure the flanges to the elastomeric member, or the bolts may be threadably engaged with the flanges.

Individual components of the driveline discussed above have imbalances due to variations during the manufacturing and assembly processes. In most vehicles each component is balanced individually, for example, by welding or adhering weights to the drive shaft. When the individual components are balanced, residual balances often remain. Occasionally the residual imbalances stack up to produce an unacceptably high level of imbalance in the assembled driveline within the motor vehicle. Such an assembled driveline may be unacceptable because it produces excessive driveline vibration and boom when the assembled vehicle is driven.

Prior art attempts to correct such imbalance of the assembled driveline include adding a clamp having a screw disposed to one side to act as a weight. The screw is positioned opposite side of the drive shaft to offset and therefore correct any residual imbalance. Other methods include welding or adhering a weight to the driveshaft. These methods often do not provide an accurate weight or position to offset the imbalance and may not survive for the life of the motor vehicle. Further attempts to correct imbalance involve removing one or more bolts and nuts securing the flexible coupling to the drive shaft and the rear axle. The nut and bolt are then replaced with another nut and bolt having a greater weight to offset the imbalance. This method requires disassembly and reassembly of driveline components. These operations take an excessive amount of time in a production environment, and provide the potential for error.

It would therefore be desirable to provide a means for correcting imbalance in a driveline assembly which does not require disassembly of the driveline components and which provides an accurate weight and position for the weight which survives for the life of the vehicle.

SUMMARY OF THE INVENTION

The present invention provides a driveline assembly having an imbalance correction mass and a method for correcting the imbalance of a driveline assembly without disassembling the driveline.

In accordance with the objects of the present invention, a driveline assembly and method for balancing the driveline are provided. The driveline includes a drive shaft assembled to a rear axle. The driveline is measured to determine an imbalance and a known graduated weight is added to balance the driveline at the interface between the drive shaft and rear axle. The weight is secured without disassembling the driveline.

DESCRIPTION OF THE PREFERRED EMBODIMENTS

Figure 1:
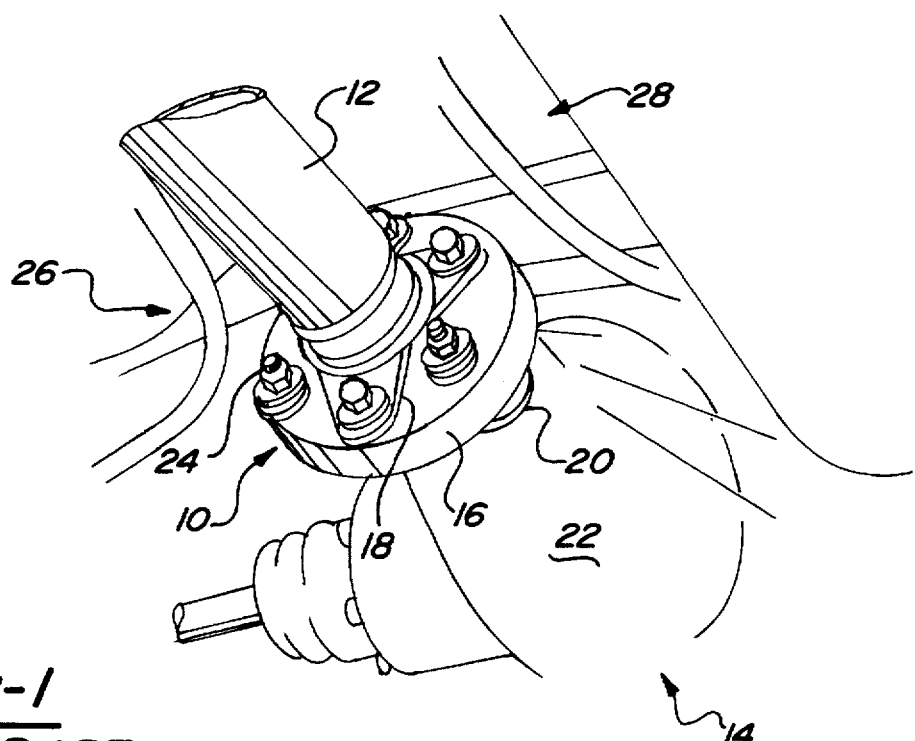
FIG. 1 is a perspective view of a prior art flexible coupling attachment between a drive shaft and rear axle.

In a motor vehicle, a flexible coupling 10 is typically provided between the drive shaft 12 and the rear axle 14 as shown in FIG. 1. An elastomeric member 16 of the coupling 10 is attached to a flange 18 on the drive shaft 12 and to a second flange 20 on the differential 22 of the rear axle 14. Each of the flanges 18, 20 is connected, respectively, to the elastomeric member 16 using a plurality of threaded fasteners 24.

Figure 2:
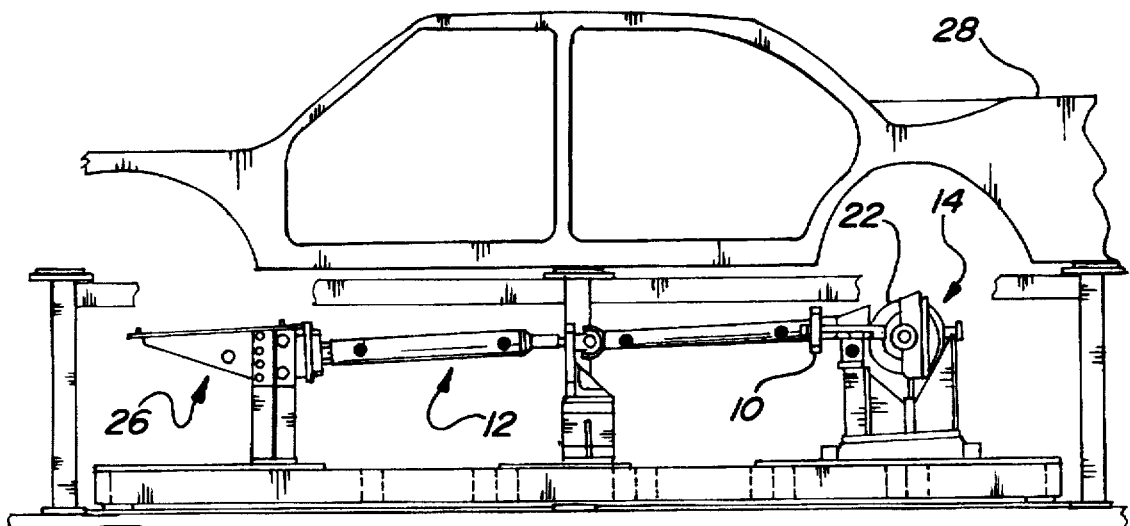
FIG. 2 is a partial side view of a prior art driveline being installed to the body of a motor vehicle.

After the driveline 26 is assembled in the vehicle 28 as shown in FIG. 2, the vehicle driveline imbalance is tested using one of several methods known in the art which typically rotate the driveline 26 and measure any imbalance detected therein. An example of such a balance method used for an assembled vehicle is taught in U.S. Pat. No. 5,431,049 to Kopp, assigned to the assignee of the present invention. The '049 patent is incorporated herein for its relevant teachings.

Other measurement techniques include a fixtured imbalance measurement, such as that shown in U.S. Pat. No. 5,419,192 to Maxwell. Another fixtured measurement technique mounts the driveline 26 in vehicle position using the vehicle mounting attachments (not shown) for the driveline 26. Furthermore, any known measurement system may be used with the present invention to provide a balanced driveline as described herein. Driveline measurements are taken to determine the amount and rotational position of the imbalance, such as taught in the '049 patent. A correction is calculated to determine a mass and position to offset the imbalance. An indicator displays to an operator how much weight and at which rotational position the weight is to be added.

In the preferred embodiment, as described above and shown in FIG. 3, the flexible coupling 10 is secured using a bolt 30 through the elastomeric member 16 through the flange 18 of the driveshaft 12. A nut 32 may be provided opposite the head of the bolt 30 to clamp the elastomeric member 16 to the flange 18, or the flange 18 may be threaded to accept the bolt 30. The known balance tester calculates how much weight and at which rotational position such weight is to be added. Because the coupling bolts 30 are equally spaced circumferentially, the tester preferably determines the angular position of the bolts 30 and indicates to the operator to add one or more weights 34 to one or more of the bolts 30 to correct the imbalance. The weights are added in addition to the existing fasteners 24, therefore not requiring removal or disassembly of the fasteners 24.

Figure 3:
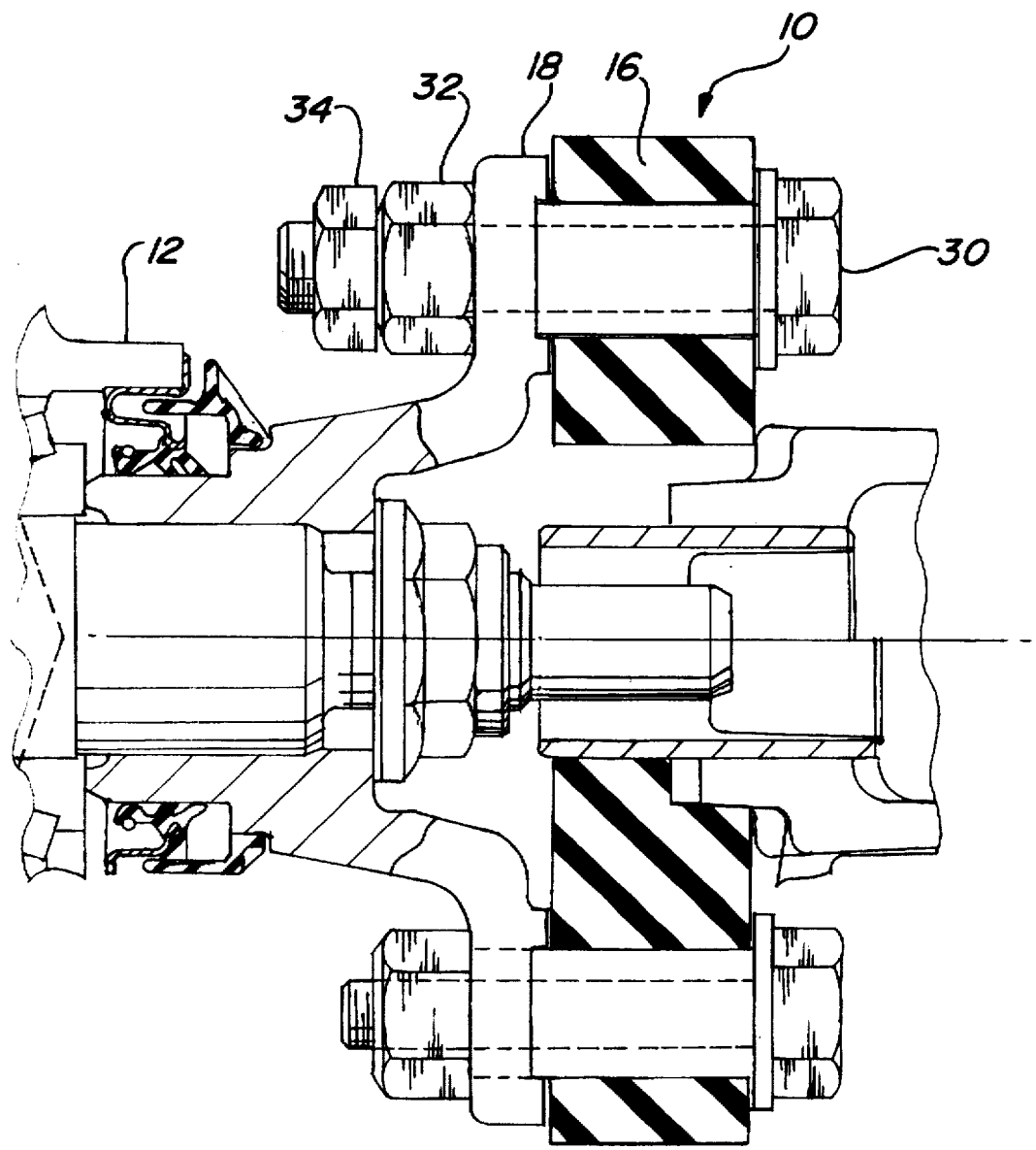
FIG. 3 is a partial cross-sectional view of a flexible coupling according to the present invention.

As shown in FIG. 3, the present invention comprises adding a mass, embodied as a threaded nut 34 of known mass, to the threaded end of the bolt 30. The bolt used in a preferred embodiment of the present invention must extend beyond the flange 18 and nut 32 to provide a means for securing a balance weight 34. The weights 34 are secured to the existing threaded fasteners which hold the flexible coupling 10 to the drive shaft 12 and rear axle 14. In the preferred embodiment, as shown in FIG. 1, the flexible coupling 10 uses six fasteners 24. Therefore, the fasteners 24 are separated by 60 degrees. Such an arrangement enables a correction weight 34 to be added either diametrically opposite the imbalance at one fastener 24, or may require correction weights 34 to be secured at more than one of the threaded bolts 30 opposite the imbalance.

In the preferred embodiment, the operator is provided with a supply of several nuts 34 which preferably weigh from 1 gram to about 8 grams, incremented by 1 gram. An indicator indicates a mass to be added at specific fastener 24 positions and the operator adds one or more nuts 34 to each bolt 30 as indicated by the imbalance detection method. In the preferred embodiment, a tester according to the '049 patent is modified to indicate the size and location of nuts 34 to be added to specific fasteners 24.

Figure 4:
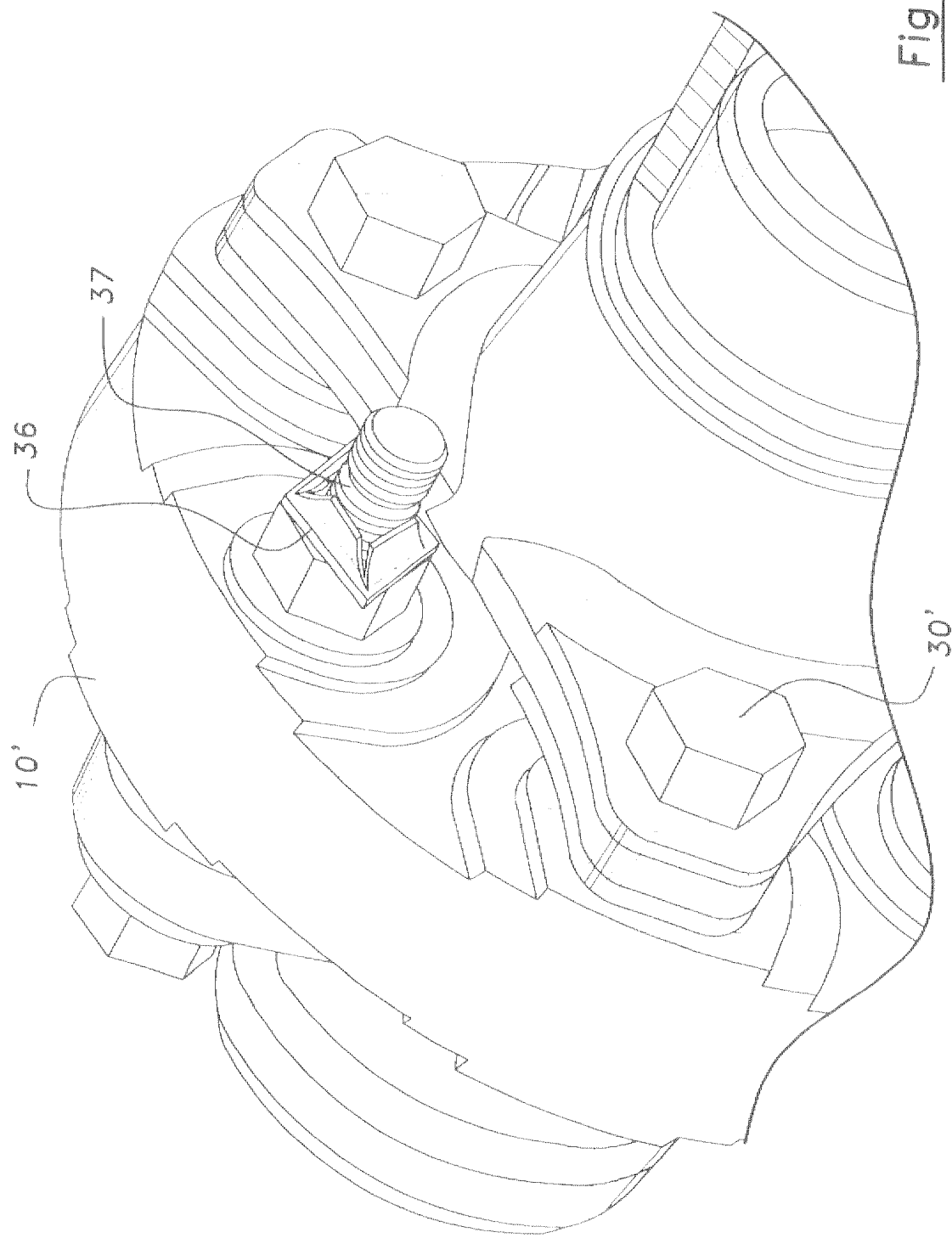
FIG. 4 is a perspective view of an alternate embodiment of a flexible coupling according to the present invention.
Figure 5:
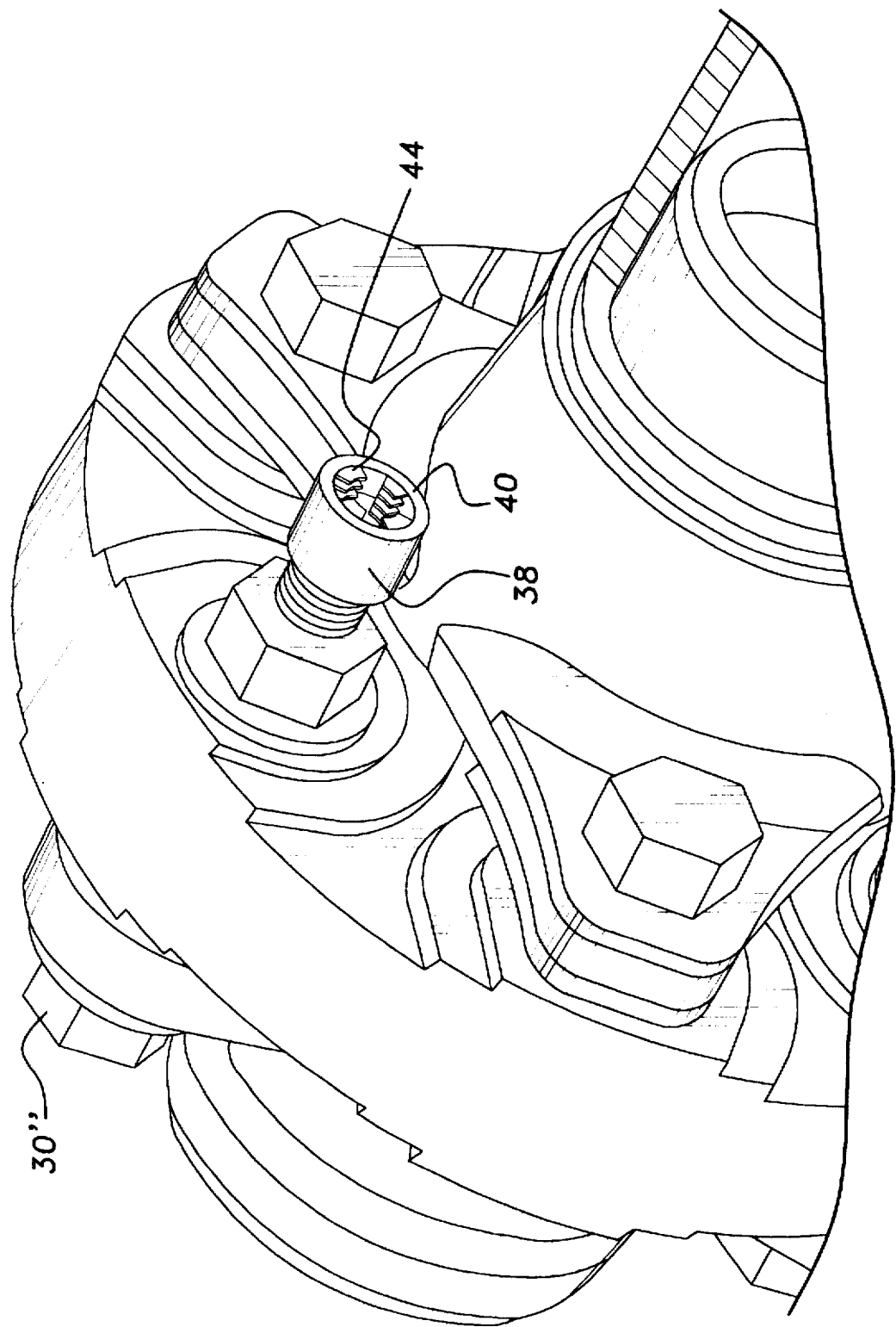
FIG. 5 is a perspective view of an alternate embodiment of a flexible coupling according to the present invention.
Figure 6:
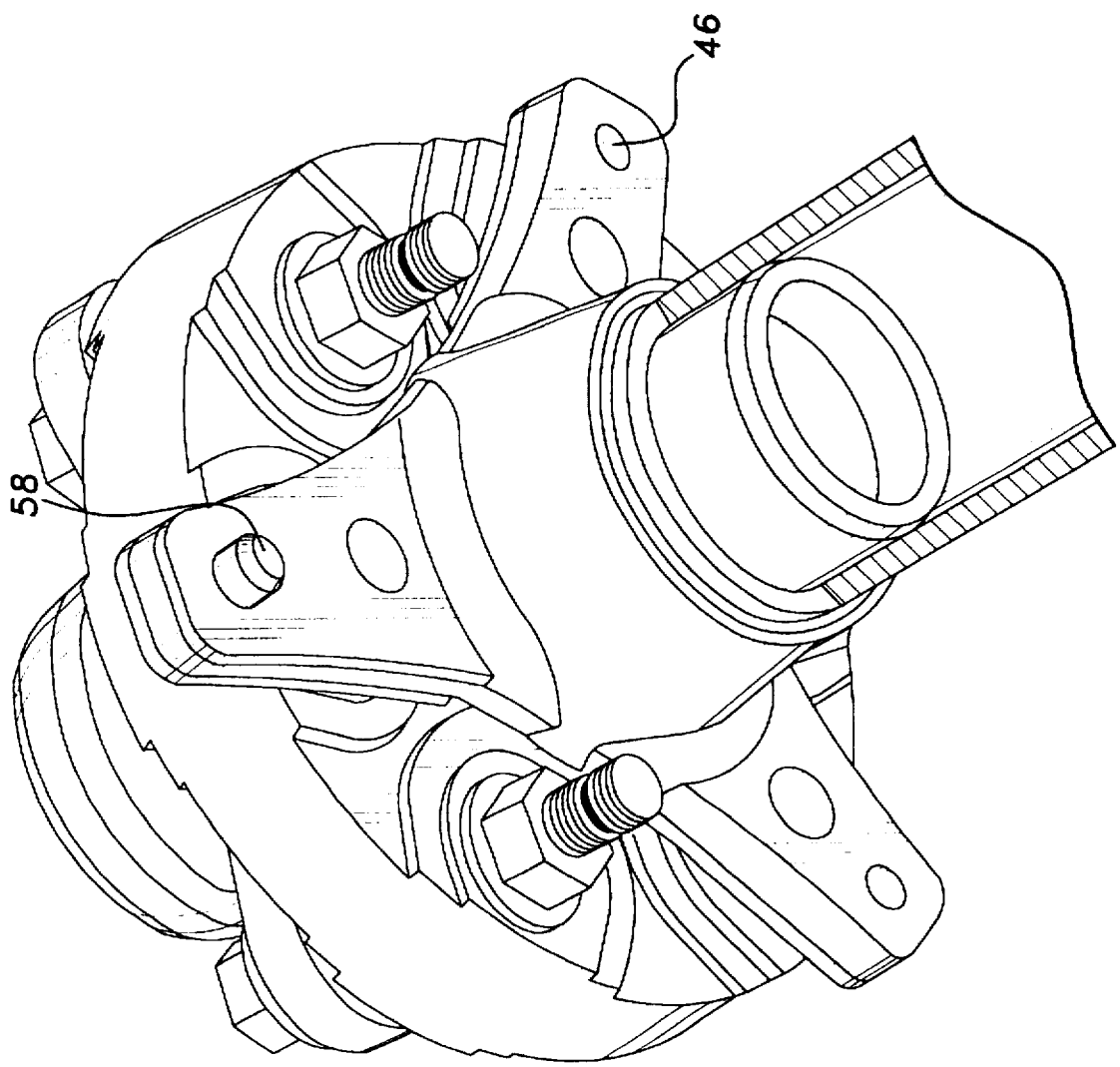
FIG. 6 is a perspective view of an alternate embodiment of a flexible coupling according to the present invention.

As shown in FIGS. 4–6, alternatively the nuts 34 described above comprise other articles, such as Tinnerman nuts, clips, caps, or other such items which engage the threaded fasteners 24 and are thus held in position by the thread of the bolt 30. As shown in FIG. 4, a Tinnerman nut 36 or similar fastener may be pushed onto the bolt 30' creating an interference fit with the threads of the bolt 30', or threadably engaged to the bolt. As shown in FIG. 4, the bolt 30' includes a recess 37 near the end of the bolt to prevent the nut 36' from falling off during rotation of the coupling 10'. As shown in FIG. 5, a slide-on nut 38 may be provided to engage the threads of the bolt 30'. The nut includes internal projections 44 which engage the threads of the bolt 30", similar to the fins on a christmas-tree type fastener (not shown). Alternatively, but not shown, the nut 38 provides an internal surface within a cylindrical member 40 to engage the threads on the bolt 30" with an interference fit. The interference fit may alternatively be provided by a plurality of internally-projecting axial ribs (not shown) or annular ribs (not shown) which engage the threads of the bolt 30. The weight of the above fasteners may be changed, for example, by using thicker of thinner material on the Tinnerman nut or other fasteners. Furthermore, the material may be varied, for example, from nylon or aluminum or steel to any other material of varying specific gravity to alter the weight.

A further alternative embodiment illustrated in FIG. 6 comprises providing circumferentially spaced apertures 46 in one or more of the flanges 18, 20 or the elastomeric member 16. The imbalance tester indicates at which apertures 46 the operator is to add weights. The weights comprise a known mass in the form of a pin 48 having a known weight which is press-fit into the aperture, a threaded fastener (not shown) threaded into the aperture, or a clip (not shown) secured through the aperture 46.

Although the preferred embodiments of the present invention have been disclosed, various changes and modifications may be made without departing from the scope of the invention as set forth in the appended claims.

What is claimed is:

1. A balanced automotive driveline assembly, comprising:
   a drive shaft;
   a rear axle drivably connected to the drive shaft;
   a coupling disposed between the drive shaft and the rear axle;
   a plurality of fasteners for connecting the coupling to the drive shaft and rear axle; and
   a balancing weight secured to one of the fasteners connecting the coupling to balance the driveline assembly.

2. A driveline assembly according to claim 1, wherein one of the plurality of fasteners comprises a bolt secured to the coupling and the balancing weight comprises a nut having a predetermined mass secured to the bolt wherein the bolt remains secured to the coupling.

3. A driveline assembly according to claim 2, wherein the driveline assembly is installed in a fixture.

4. A driveline assembly according to claim 3, wherein the coupling comprises a flexible coupling.

5. A driveline assembly according to claim 2, wherein the driveline assembly is installed in a motor vehicle.

6. A driveline assembly according to claim 2, wherein the weight comprises a tinnerman nut.

7. A driveline assembly according to claim 2, wherein the threaded fastener comprises a threaded surface and the weight comprises a cap having an internal surface for engagement with the threaded surface of the threaded fastener, the cap having a known mass.

8. A driveline assembly according to claim 7, wherein the internal surface comprises a surface having a plurality of radially-projecting annular ribs.

9. A driveline assembly according to claim 8, wherein the cap is injection molded.

10. An automotive driveline assembly, comprising:
    a drive shaft rotatably supported by a motor vehicle;
    a rear axle drivably connected to the drive shaft;
    a flange provided between the drive shaft and the rear axle; and
    a driveline balancing weight connected to the flange for balancing the driveline assembly, wherein the weight is added without disassembling the flange.

11. A driveline assembly according to claim 10, wherein the flange has a plurality of circumferentially spaced apertures and the weight comprises a pin of known weight secured to one of the apertures provided in the flange.

12. A driveline assembly according to claim 10, wherein the flange has a plurality of circumferentially spaced apertures and the weight comprises a threaded fastener threadably engaged with one of the apertures provided in the flange.

13. A driveline assembly according to claim 10, wherein the flange is connected to a flexible coupling.

14. A method for balancing an automotive driveline assembly, comprising:
    assembling a drive shaft to a rear axle having a flange therebetween forming a driveshaft and axle assembly;
    measuring the imbalance of the drive shaft and axle assembly;

determining the position and mass of a weight to be assembled to the drive shaft and axle assembly; and securing a mass to the flange wherein the flange remains assembled.

15. A method for balancing a driveline assembly according to claim 14, wherein the flange comprises a coupling.

16. A method for balancing a driveline assembly according to claim 15, wherein the coupling comprises a flexible coupling.

17. A method for balancing a driveline assembly according to claim 16, wherein the flexible coupling is secured with a plurality of bolts and the weight comprises a nut secured to one of said bolts.

18. A method for balancing a driveline assembly according to claim 14, wherein the drive shaft and axle assembly are assembled into a motor vehicle then measured for imbalance.

19. A method for balancing a driveline assembly according to claim 14, wherein the drive shaft and axle assembly are assembled onto a fixture, then measured for imbalance.

20. A method for balancing a driveline assembly according to claim 14, wherein the flange comprises a flange for a universal joint.

* * * * *